United States Patent [19]

Shaw

[11] Patent Number: 4,993,286

[45] Date of Patent: Feb. 19, 1991

[54] HOLDING APPARATUS FOR SPRING-HINGE SPECTACLE FRAMES

[76] Inventor: John P. Shaw, P.O. Box 2037, Clanton, Ala. 35045

[21] Appl. No.: 528,911

[22] Filed: May 29, 1990

Related U.S. Application Data

[63] Continuation of Ser. No. 441,153, Nov. 22, 1989, abandoned, which is a continuation of Ser. No. 263,650, Oct. 28, 1988, abandoned.

[51] Int. Cl.$^5$ .............................................. B25B 7/00
[52] U.S. Cl. ............................................ 81/3.6; 269/4
[58] Field of Search ..................... 81/3.5, 3.6; 269/6, 269/41, 233, 249

[56] References Cited

U.S. PATENT DOCUMENTS

| | | | |
|---|---|---|---|
| 2,199,581 | 5/1940 | Uhlemann | 81/3.6 |
| 2,450,229 | 9/1948 | Blohm | 81/3.6 |
| 2,523,649 | 9/1950 | DeLorey | 81/3.6 |
| 2,952,173 | 9/1960 | Fexas | 81/3.6 |

Primary Examiner—Roscoe V. Parker
Attorney, Agent, or Firm—Mason, Fenwick & Lawrence

[57] ABSTRACT

A hand tool for use with spring-hinge type spectacles to facilitate removal and replacement of temple screws pivotally connecting apertured hinge ear portions of companion hinge parts mounted on the lens frame and the forwardmost ends of the temple members, including a pistol shaped tool body member having a slide channel portion and a forwardly extending rigid support arm, an elongated post pivotally mounted on the support arm, a lens frame holding subassembly adjustably supported on the post including a lens-engaging pad and a lens restraining arm in spaced overlying relation to lens-engaging surface portions of the pad, and a temple holding subassembly comprising a pair of confronting temple gripper pads spaced to define an upwardly opening temple-receiving recess therebetween. A pad adjusting mechanism is provided for moving the gripper pads toward and away from each other to grip and release a temple member located therebetween. The arrangement facilitates one-hand holding of the hand tool by an operator with the lens frame and temple members releasably restrained against movement relative to each other in their respective holding subassemblies.

12 Claims, 4 Drawing Sheets

4,993,286

HOLDING APPARATUS FOR SPRING-HINGE SPECTACLE FRAMES

This application is a continuation of application Ser. No. 263,650, filed Oct. 28, 1988, and Ser. No. 441,153, filed Nov. 22, 1989, now abandoned.

BACKGROUND AND OBJECTS OF THE INVENTION

The present invention relates, in general, to hand tools for use in connection with repair or adjustment of spectacle frames and the like, and more particularly to a hand tool for use with spring-hinge type spectacles wherein the temple piece is coupled to the lens frame portion by a spring-hinge coupling structure, wherein the tool facilitates insertion or extraction of the temple screw.

Heretofore considerable difficultly has been encountered in replacing the temple screw connecting the temple pieces of spectacles with the eye glass frames, where a spring-hinge type connection is employed. Typically, the temple pieces at the front end portion thereof include a hinge component incorporating a spring structure which accommodates a limited amount of flexible movement of the associated temple member relative to the frame for the lenses beyond the normal range allowed by the temple screw, the spring hinge component being removably connected to the hinge component fixed to the lens frame by a tiny temple screw. Usually, the assistance of another person to hold the components in appropriate position during insertion or extraction of the temple screw, or the use of a complex and expensive special vice, has been required to achieve such insertion or extraction of the temple screw. This is because insertion of the tiny temple screw in such spring-hinge type spectacles requires precise proper alignment of the temple and lens frame while maintaining sufficient pressure to overcome the tension of the spring within the hinge structure during the screw insertion procedure.

An object of the present invention is the provision of a convenient hand tool which holds the temple and lens frame of spring-hinge type spectacles in proper alignment and with proper pressure maintained to overcome the tension of the spring structure, allowing only one hand to be used for the tool while leaving the operator's other hand free to insert or extract the hinge screw.

Other objects, advantages and capabilities of the present invention will become apparent from the following detailed description, taken in conjunction with the accompanying drawings illustrating a preferred embodiment of the invention.

DETAILED DESCRIPTION OF A PREFERRED EMBODIMENT

Figure 1:
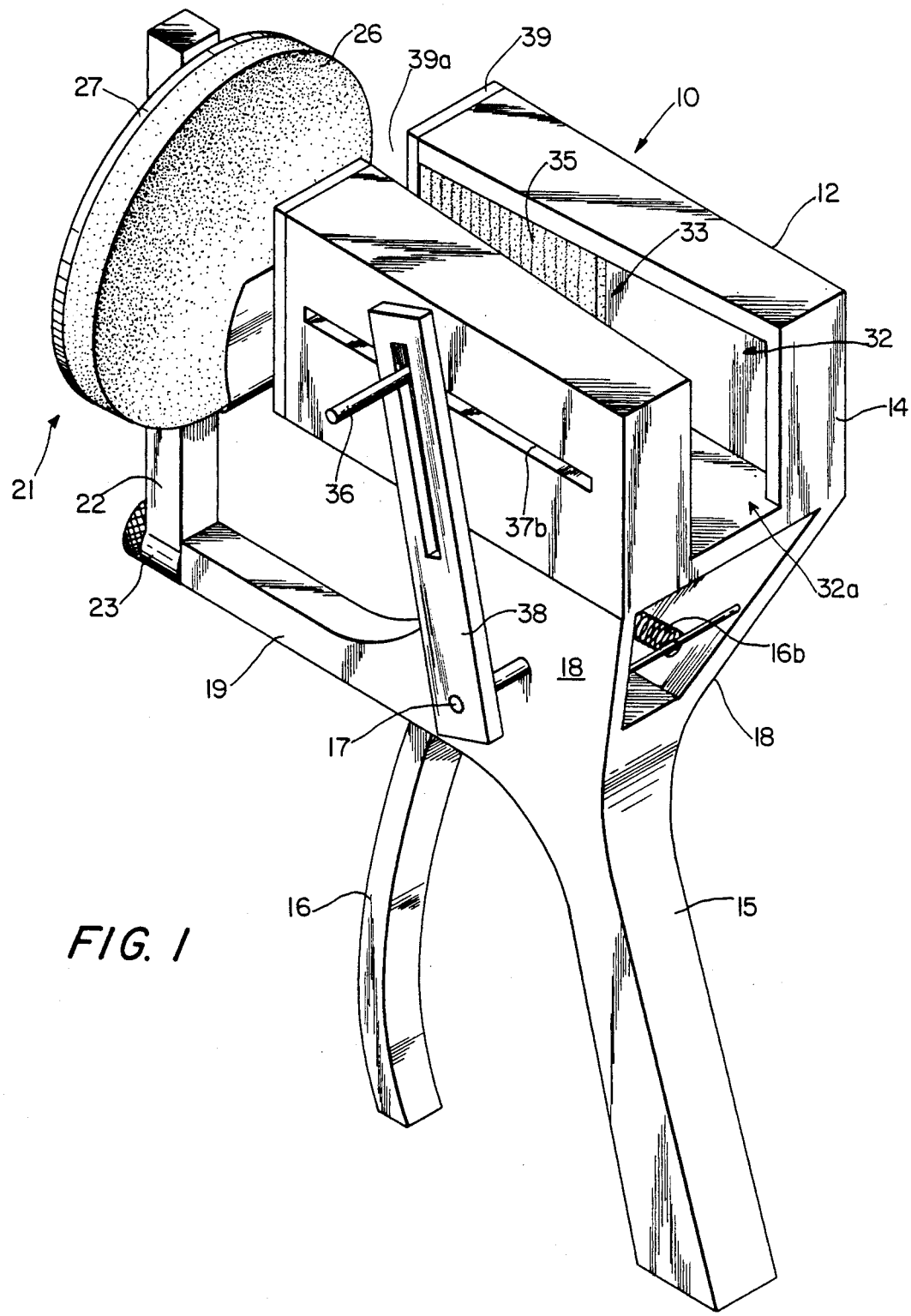
FIG. 1 is a perspective view of a hand tool embodying the present invention for supporting and maintaining proper position and pressure on the lens frame and temple components of spring-hinge type spectacles during hinge screw insertion or extraction procedures.
Figure 2:
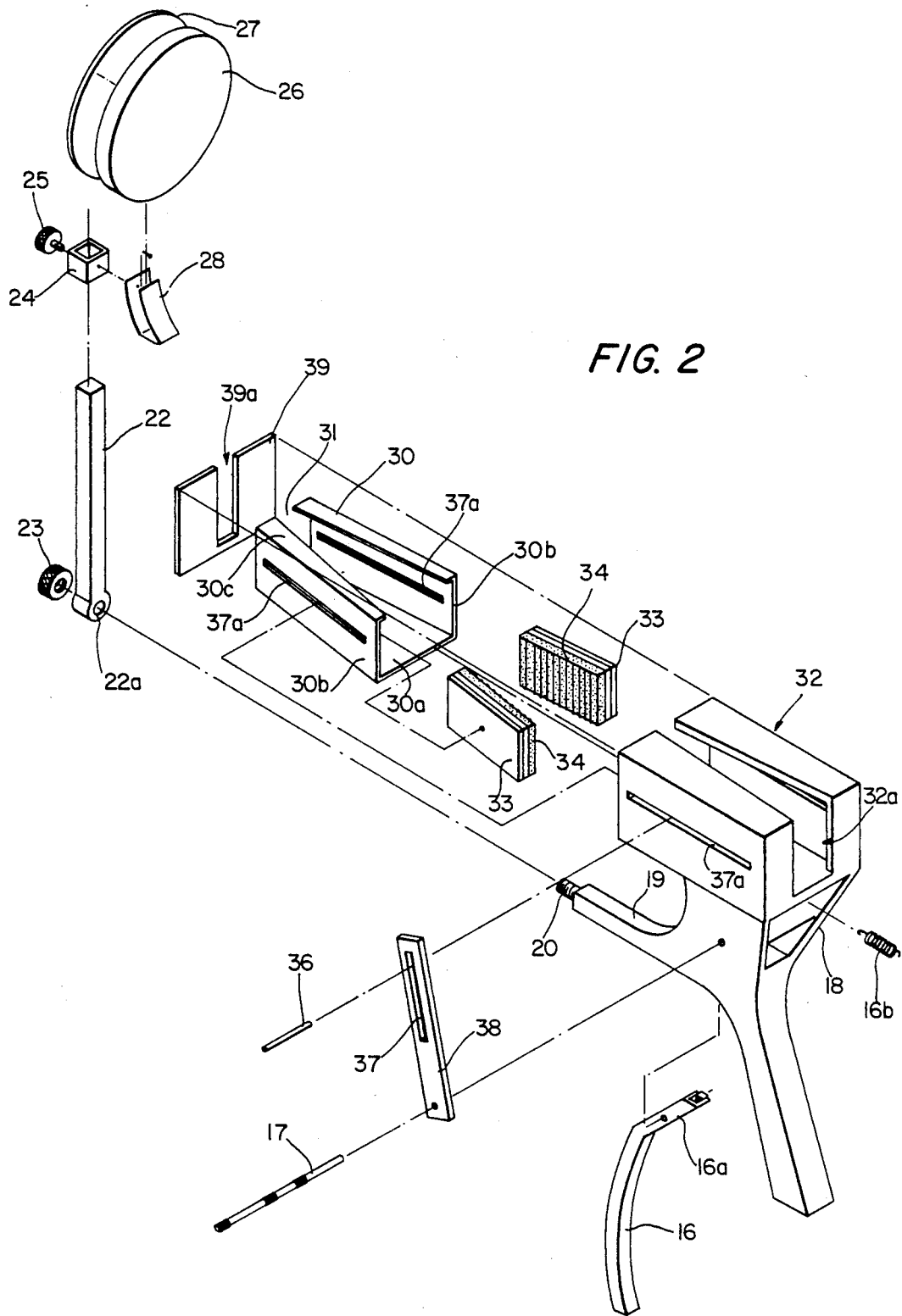
FIG. 2 is an exploded perspective view thereof.

Referring to the drawings, wherein like reference characters designate corresponding parts throughout the several figures, the spring-hinge type spectacle supporting hand tool of the present invention is indicated generally by the reference character 10, and comprises pistol shaped casing 12 having an upper gripper-housing slide channel portion 14, and a handle formation 15 having a trigger 16 pivoted therein on a pivot pin 17. Projecting forwardly from the transition portion 18 of the casing between the upper slide channel portion 14 and handle formation 15 is a rigid support arm 19 having a threaded stud or stub shaft 20 on the forwardmost end thereof. A lens and lens frame supporting subassembly 21 is supported for angular adjustable movement on the stub shaft 20 of the support arm 19, including a brace pad supporting post 22 apertured at its lower end, as indicated at 22a, to receive the stub shaft 20 therethrough and having a clamp nut 23 threaded on the end of the stub shaft 20. A supporting bracket or collar 24 for the lens holding subassembly embraces and is slidable on the post 22 and can be fixed at various positions of vertical adjustment along the longitudinal axis of the post 22 by a clamp nut 25. The bracket or collar 24 supports a concave lens-engaging pad 26 carried on the metal backing dish 27 and an associated pendulous support arm 28 having a front leg 28a spaced outwardly from and extending substantially from just outwardly of the perimeter of the lens engaging pad 26 to substantially sustain the axial center thereof, spaced an appropriate distance from the concave face of the pad 26 to receive the lens of the lens frame component of the spectacles between the support arm portion 28a and the pad 26.

Figure 3:
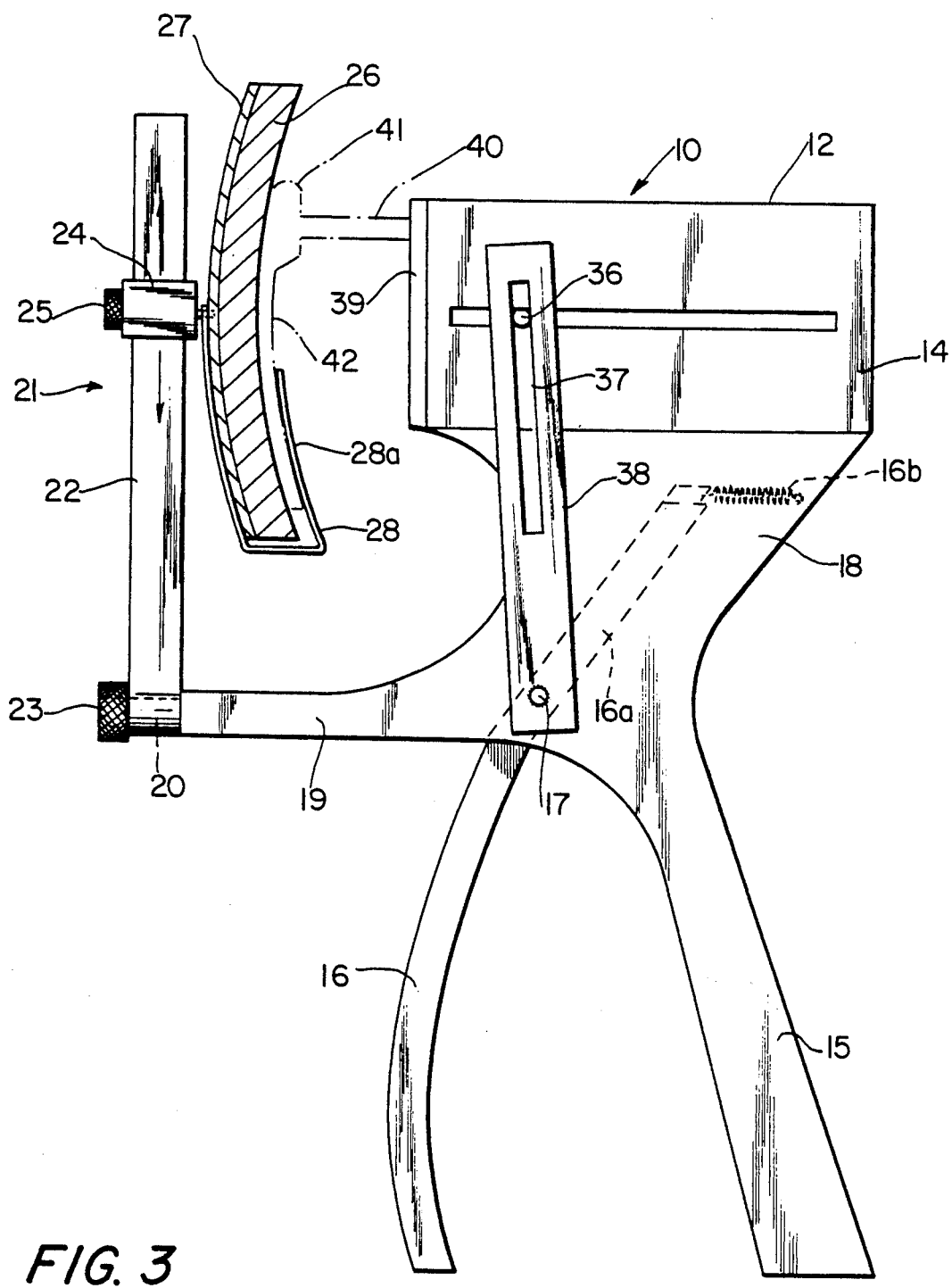
FIG. 3 is a side elevational view thereof.
Figure 4:
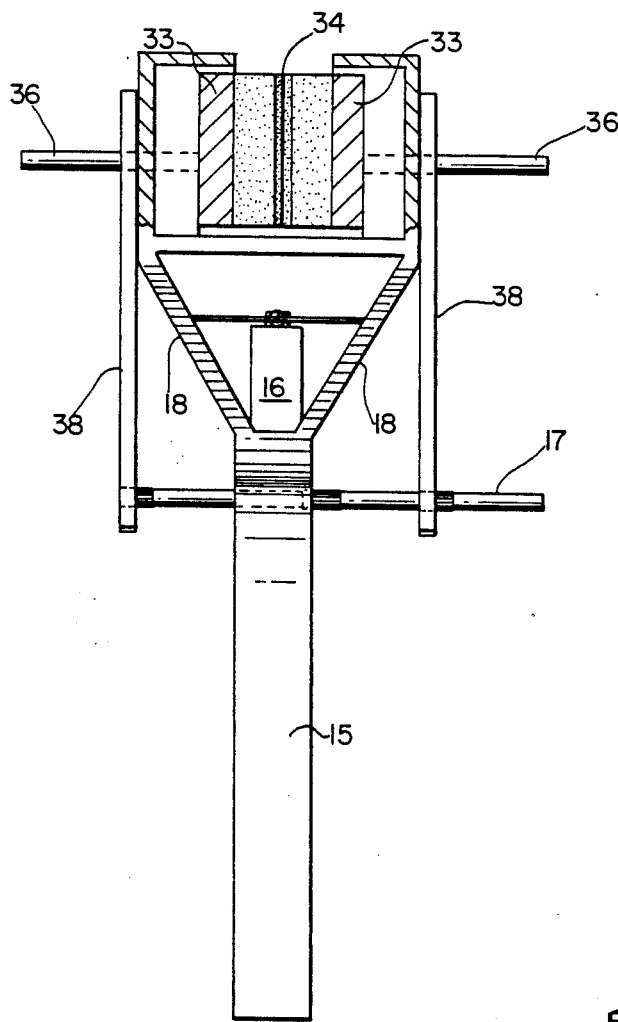
FIG. 4 is a top plane view thereof.
Figure 5:
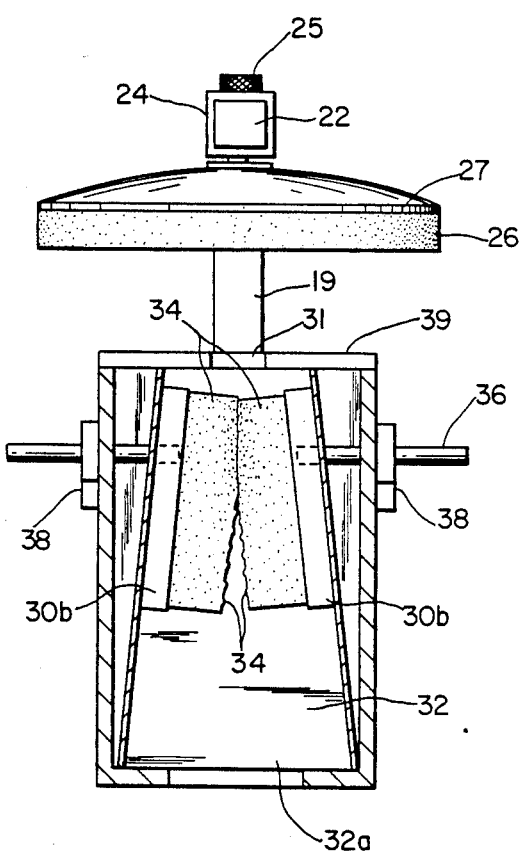
FIG. 5 is a rear elevational view of the hand tool.

The slide channel portion 14 of the tool casing 12 includes, in the illustrated embodiment, a channel shaped bushing member 30 having a bottom 30a, vertical forwardly converging sides 30b and a pair of top flange members 30c defining a truncated triangular, upwardly opening entrance throat 31 which is aligned with the similarly shaped slideway opening 32 in the rearwardly opening chamber 32a of the slide channel portion 14. The slide channel defined between the sides 30b of the bushing member 30 is so shaped that the side walls are disposed in planes which converge toward the brace pad 26, as shown in FIG. 3, and slideably support gripper pad members 33. Each gripper pad 33 comprises a flat backing panel and a solid pad with ribbed edge 34 of flexibly deformable plastic or rubber or similar deformable material, for example, with the gripping ribbed edge 34 of one pad 33 converging with the gripper ribbed edge 34 of the other pad 33. The backing panels of the gripper pads 33 have slide pins 36 projecting outwardly therefrom through registering slots 37a and 37b in the side walls of the channel member 30 and the slide channel formation 14, to be received in elongated slots 37 of rocker arms 38 which are fixed at their lowermost ends to the pivot pin 17. A stop member 39 is carried at the forwardmost end of the slide channel portion 14 of the main body 12 having an upwardly opening elongated slot 39a for receiving the temple piece, indicated at broken lines in 40, of spectacles, indicated at 41, to be supported and positioned by the hand tool. The trigger 16 which is also keyed or otherwise fixed to the pivot pin 17 to rotate the pivot 17 and rocker arm 38 about the axis of the pivot pin 17 upon movement of the trigger 16, includes an extension 16a projecting above the pivot pin 17 and connected at its upper end to a spring 16b which resiliently biases the trigger to return to the position shown in FIG. 1.

To operate the tool, one of the eye glass or spectacles temple pieces is placed in the slot 39 and the slideway opening 32 of the chamber 32a communicating therewith and between the confronting edges 35 of the gripper pads 33 in the chamber 32a. The adjacent lens of the eyeglass frame component 42 is then carefully inserted under the pendulous support arm 28a overlying the rearwardly facing concave surface of the brace pad member 26, making sure that the front surface of the eyeglass lens is resting against the pad 26. It will be noted that the brace pad 26 and its associated metal backing 27 are adjustable, by loosening the screws 25 and 23 associated with the collar 24 and lower end of the post 22, freeing the post 22 to be swung to the right or left and freeing the brace pad 26 to move up or down with adjustment of the collar 24 along the post 22. These adjustments should be made so that the lens is centered on the brace pad 26. The screws 23 and 25 should then be tightened, clamping the brace pad 26 in the properly adjusted position, and the trigger 16 is then squeezed by one hand of the operator, causing the rocker arms 38 to swing in a counterclockwise direction about the pivot 17 to slide the pin 36 forwardly in its associated slots 37b and carry the gripper pads 33 forwardly toward the brace pad 26. Due to the convergence of the sides 30b of the bushing member 30 in the channel 32a, the gripping edges 35 of the gripping pads 32 are forced towards each other, causing them to grip and secure the temple piece positioned between the gripper pads 33. While holding the tool in this manner and applying continuous squeezing pressure on the trigger 16, the hinge screw may then be removed from the spring hinge structure, while the holes for the hinge screw are maintained in proper alignment and the spring-hinge is maintained under appropriate pressure.

The procedure for replacing the hinge screw involves placing the eyeglass frame component 42 in place against the brace pad 26 behind the pendulous support arm 28 and placing the relevant eyeglass temple piece in the slot 32 defined between the gripper pads 33. The temple piece is slidably moved by hand to dispose the forwardmost, hinge connecting portion thereof as close as possible to the eyeglass frame component 42, the hinge ear components are manually aligned and the trigger 16 is squeezed to move the gripper pads 33 into gripping position and hold the eyeglass lens frame and temple piece components in proper relative position. The hinge screw is then inserted, the trigger 16 is released whereupon the spring 16b returns the trigger in a clockwise direction to its normal release position, moving the gripper pads 33 rearwardly in the direction of divergence of the inclined vertical sides 30b and retracting the gripper pads 33 from each other to release the temple piece, enabling the spectacles to be removed from the tool.

I claim:

1. Apparatus for use with spring-hinge type spectacles to facilitate removal and replacement of temple screws pivotally connecting apertured ear portions of companion hinge parts mounted on the lens frame and the forwardmost ends of the temple members, comprising a body member having a slide channel portion and a forwardly extending rigid support arm, an elongated post carried by said support arm, a lens frame holding subassembly adjustably supported on said post including a lens-engaging pad and a lens-restraining arm in spaced overlying relation to lens-engaging surface portions of said pad to receive and support a lens portion of the spectacle lens frame against said pad, said slide channel portion including a temple holding subassembly comprising a pair of confronting temple gripper pads spaced to define an upwardly opening temple-receiving recess therebetween and pad adjusting means for moving said gripper pads toward and away from each other to grip and release a temple member located therebetween, and means for supporting the body member at a selected position with the lens frame and temple members releasably restrained against movement relative each other in their respective holding subassemblies.

2. Apparatus as defined in claim 1, wherein said temple holding subassembly includes a pair of vertical side walls having confronting slide surfaces extending generally vertically in a pair of inclined planes converging toward the lens frame holding subassembly, said gripper pads having slide surfaces bearing upon and slidable on the confronting slide surface of said side walls, and means for concurrently moving said gripper pads in advance and retraction direction relative to said lens frame holding subassembly causing the pair of gripper pads to progressively converge towards each other during advance movement and withdrawal from each other during retraction movement.

3. Apparatus as defined in claim 1, wherein said gripper pads are each formed of solid pads with ribbed surfaces positioned along converging paths during the advance movement thereof.

4. Apparatus as defined in claim 2, wherein said gripper pads are each formed of solid pads with ribbed surfaces positioned along the converging paths during the advance movement thereof.

5. Apparatus as defined in claim 1, wherein said body member is a substantially pistol shaped body including said slide channel portion and said supporting means and includes a trigger portion adjacent the supporting means pivotally mounted on the body member and means responsive to movement of the trigger portion for concurrently moving said gripper pads toward and away from said lens frame holding subassembly.

6. Apparatus as defined in claim 2, wherein said body member is a substantially pistol shaped body including said slide channel portion and said supporting means and includes a trigger portion adjacent the supporting means pivotally mounted on the body member and means responsive to movement of the trigger portion for concurrently moving said gripper pads toward and away from said lens frame holding subassembly.

7. Apparatus as defined in claim 3, wherein said body member is a substantially pistol shaped body including said slide channel portion and said supporting means and includes a trigger portion adjacent the supporting means pivotally mounted on the body member and means responsive to movement of the trigger portion for concurrently moving said gripper pads toward and away from said lens frame holding subassembly.

8. Apparatus as defined in claim 4, wherein said body member is a substantially pistol shaped body including said slide channel portion and said supporting means and includes a trigger portion adjacent the supporting means pivotally mounted on the body member and means responsive to movement of the trigger portion for concurrently moving said gripper pads toward and away from said lens frame holding subassembly.

9. Apparatus as defined in claim 1, including pivot means connecting said elongated post to said support arm and a clamp nut connected therewith for fixing said elongated post at various angular positions relative to said support arm, and a slide collar member movably longitudinally along said post having set screw means for releasably securing the slide collar member at various positions of adjustment, said slide collar member including means supporting said lens frame holding subassembly therefrom providing the adjustable support of the lens frame holding subassembly on said post.

10. Apparatus as defined in claim 2, including pivot means connecting said elongated post to said support arm and a clamp nut connected therewith for fixing said elongated post at various angular positions relative to said support arm, and a slide collar member movable longitudinally along said post having set screw means for releasably securing the slide collar member at various positions of adjustment, said slide collar member including means supporting said lens frame holding subassembly therefrom providing the adjustable support of the lens frame holding subassembly on said post.

11. Apparatus as defined in claim 3, including pivot means connecting said elongated post to said support arm and a clamp nut connected therewith for fixing said elongated post at various angular positions relative to said support arm, and a slide collar member movable longitudinally along said post having set screw means for releasably securing the slide collar member at various positions of adjustment, said slide collar member including means supporting said lens frame holding subassembly therefrom, providing the adjustable support of the lens frame holding subassembly on said post.

12. Apparatus as defined in claim 4, including pivot means connecting said elongated post to said support arm and a clamp nut connected therewith for fixing said elongated post at various angular positions relative to said support arm, and a slide collar member movable longitudinally along said post having set screw means for releasably securing the slide collar member at various positions of adjustment, said slide collar member including means supporting said lens frame holding subassembly therefrom providing the adjustable support of the lens frame holding subassembly on said post.

* * * * *